July 12, 1932.  F. KERSHAW ET AL  1,867,510
CARRYING CHAIN
Filed July 11, 1928
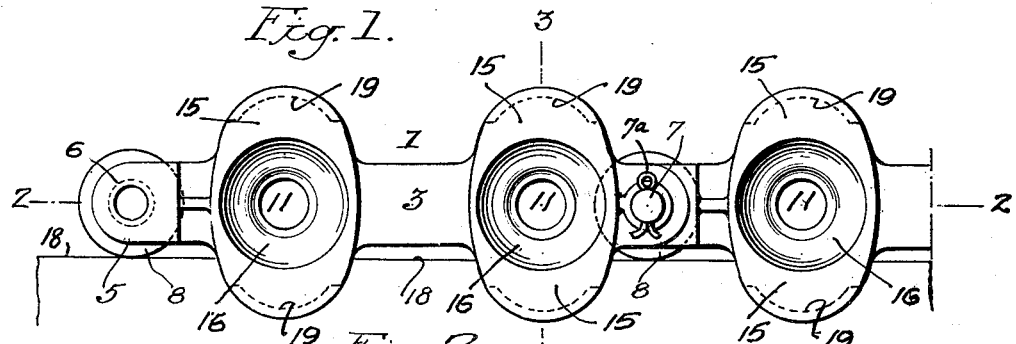
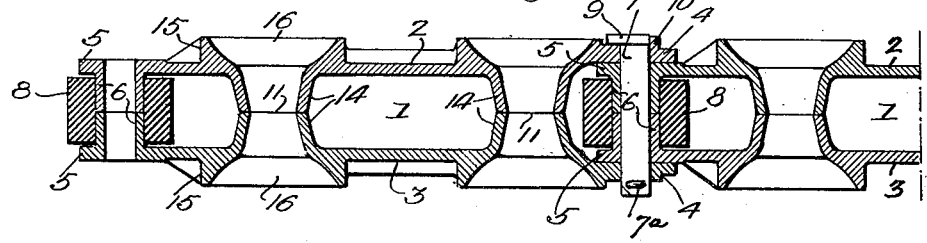
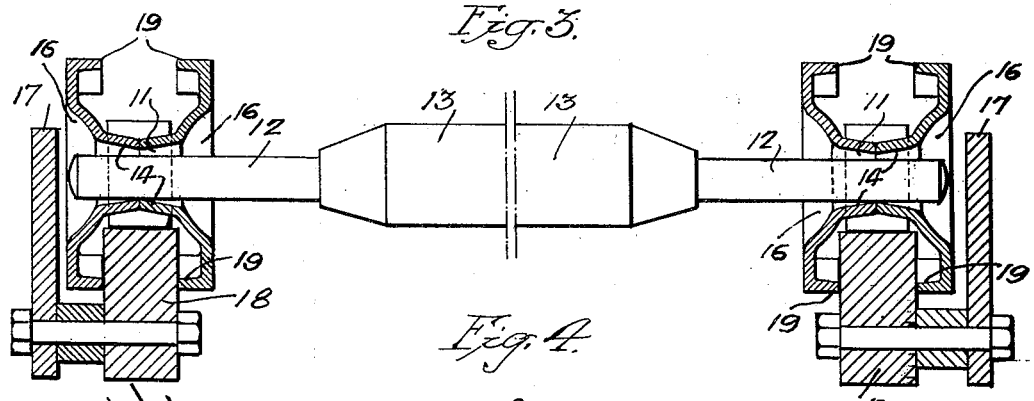
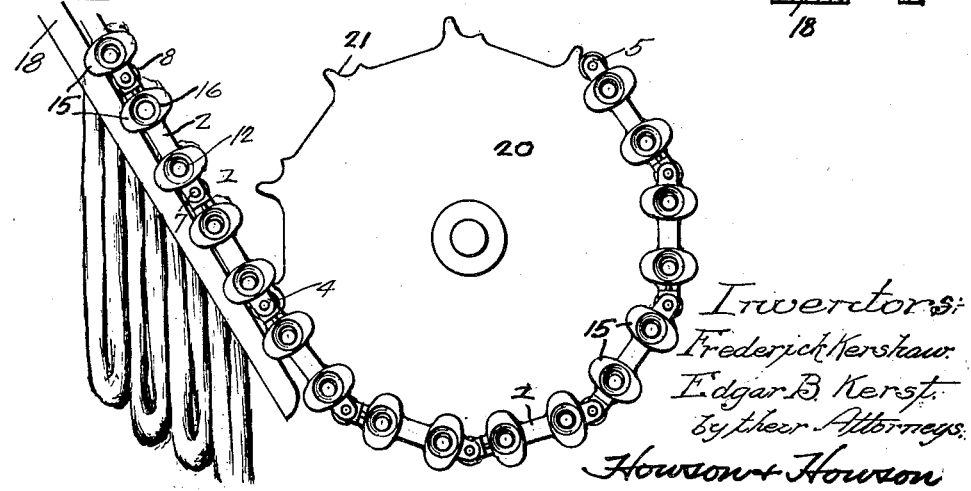
Inventors:
Frederick Kershaw
Edgar B. Kerst
by their Attorneys.
Howson + Howson Patented July 12, 1932

1,867,510

UNITED STATES PATENT OFFICE

FREDERICK KERSHAW, OF PHILADELPHIA, PENNSYLVANIA, AND EDGAR B. KERST, OF PROVIDENCE, RHODE ISLAND, ASSIGNORS TO PROCTOR & SCHWARTZ, INCORPORATED, OF PHILADELPHIA, PENNSYLVANIA, A CORPORATION OF PENNSYLVANIA

CARRYING CHAIN

Application filed July 11, 1928. Serial No. 291,915.

This invention relates to certain improvements in chains used for carrying the poles upon which yarn is hung while being conveyed through a drying chamber, although the invention can be used for other purposes where it is desired to suspend yarn from poles.

In the accompanying drawing:

Fig. 1 is a side view of the improved chain;

Fig. 2 is a sectional plan view taken on the line 2—2, Fig. 1;

Fig. 3 is a transverse sectional elevation taken on the line 3—3, Fig. 1; and

Fig. 4 is a view showing the improved chain passing around a sprocket wheel.

Each link 1 of the chain is made in two parts 2 and 3, respectively. The ends 4 at one end of each link overlap the ends 5 at the opposite end of the next adjoining link, as shown in Figs. 1 and 2. The ends 5 have tubular projections 6 which abut each other at the center of the chain, as shown in Fig. 2.

The adjoining ends of the links of the chain are coupled together by a pin 7 extending through openings in the parts 4 and 5, as shown in Fig. 2.

On the projections 6, 6 of the chain are wheels 8 which are arranged to travel on tracks or rails 18, as shown in Figs. 3 and 4.

The heads 9 of the pivot pins 7 are flattened on one side and fit against lugs 10 on the ends 4 of the links of the chain, so as to prevent the pins turning in the ends 4 of the links, the ends 5 having the projections 6, 6 thereon being free to turn on the pins 7. Suitable cotter pins 7a secure the pivot pins in place and tie the parts of the links and the chain together.

This construction may be modified, however, without departing from the essential features of the invention.

In each link 1 two transverse openings 11, 11 are formed for the reception of trunnions 12, of poles 13. The poles 13 are preferably conical at each end and the reduced trunnions 12 project from the beveled portions as clearly shown in Fig. 3, the trunnions 12 extending beyond the conical portions of the poles.

The sections 2 and 3 of each link 1 are respectively provided with tapered tubular projections 14 which are in axial alignment and extend toward each other on the inside of the links, the projections of the one section abutting the projections of the other section of the link at the center of the chain, as clearly shown in Fig. 2.

On the outside of each section and axially aligned with each of the tubular projections 14 is a projection 15 having a concaved opening 16 which provides a flared mouth for each of the openings 11 as shown, so that the trunnions 12 of the poles can be readily inserted in the holes 11.

The poles can be readily inserted into a pair of spaced chains by first introducing one of the trunnions into an opening 11 in one of the chains until the conical portion of the pole is within the flared mouth of the opening, this provides clearance between the end of the other trunnion and the other chain, so that the said other trunnion can be placed in position in the opening 11 in the link of the second chain.

In order to retain the poles in position laterally, rails 17 are provided, which retain the poles against longitudinal movement in the openings in the chain but yet allowing freedom so as to not interfere with the forward movement of the chain.

As shown in the drawing the projections 15 are elliptical in form and extend above and below the links 1. Extending inwardly from each of the opposite ends of each of the projections is a flange 19. The flanges of oppositely disposed link sections engage the opposite sides of each of the tracks 18, to prevent the chains from being moved laterally of the tracks, by the insertion or extraction of the poles, dispensing with any flanges on the track itself or on the wheels which support the chain.

The chains are adapted to pass around sprocket wheels 20, one of which is shown in Fig. 4. These sprocket wheels have teeth 21 which engage the wheels 8 of the chain.

We claim:

1. The combination of a pair of laterally spaced carrying chains having substantially aligned transverse openings extending completely through said chains and adapted to receive, respectively, the opposite ends of a pole adapted to be temporarily carried by said chains, the ends of the pole loosely fitting within the respective openings and the mouth of each opening being flared in order that the pole may be readily removed from and inserted within said openings.

2. The combination of a pair of laterally spaced carrying chains having substantially aligned transverse openings extending completely through the respective chains and adapted to receive, respectively, the opposite ends of a pole adapted to be temporarily carried by said chains, the ends of the pole extending completely through the chains and loosely fitting within the respective openings in order that the pole may be readily removed from and inserted within said openings, and guards located outside the chains and adjacent the protruding ends of the pole respectively, to prevent accidental removal of the ends of the pole from the chains.

3. The combination in a pole carrying chain, of a series of pivotally connected links, each link having a tapered transverse opening extending completely therethrough, intermediate the link pivots, for the reception and relatively loose support of a pole, a track for supporting the chain; and a projection on each side of the chain extending below the surface of the track for maintaining the chain against lateral displacement relative to the track.

4. The combination in a pole carrying chain, of a series of pivotally connected links, each link having a tapered transverse opening, intermediate the link pivots, for the reception of a pole, a track for supporting the chain; a projection on the chain extending below the surface of the track for maintaining the chain against lateral displacement relative to the track; and wheels located at the pivots and adapted to ride on said track for carrying the chain.

5. The combination in a pole carrying chain of a series of links, each link comprising a pair of similar parts, each part having a transverse opening intermediate its ends, adapted when said parts are assembled to axially align with each other to provide an opening extending completely through the chain for the reception and relatively loose support of a pole; a pivot pin at each end of each link extending through the several parts of adjoining links; and means for tying the link parts together to form the chain.

6. The combination in a pole carrying chain of a series of links, each link comprising a pair of similar parts, each part having a transverse opening intermediate its ends, the transverse openings of said similar parts being axially aligned with each other when assembled to provide an opening extending completely through the chain for the reception and relatively loose support of a pole and the transverse opening in each part having a flared mouth to facilitate the insertion of a pole therein; a pivot pin at each end of each link extending through the several parts of adjoining links; and means for tying the link parts together to form the chain.

7. The combination in a pole carrying chain of a series of links, each link comprising a pair of similar parts, each part having a transverse opening intermediate its ends, adapted when assembled to provide an opening extending completely through the chain for the reception and relatively loose support of a pole; a pivot pin at each end of each link extending through the several parts of adjoining links; means for tying the link parts together to form the chain; a track for supporting said chain; and a projection on each of said link parts adapted to extend below the chain carrying surface of the track, the projections of the respective link parts being disposed at opposite sides of the track for preventing lateral displacement of the chain relative to the track.

8. The combination in a pole carrying chain of a series of links, each link comprising a pair of similar parts, each part having a transverse opening intermediate its ends adapted when assembled to provide an opening extending completely through the chain for the reception and relatively loose support of a pole; a pivot pin at each end of each link extending through the several parts of adjoining links; means for tying the link parts together to form the chain; a track for supporting said chain; and a projection on each link part at the transverse opening therein, adapted to extend below the chain carrying surface of the track, the projections of the respective link parts being disposed at opposite sides of the track for preventing lateral displacement of the chain relative to the track when a pole is inserted in the opening.

9. The combination in a pole carrying chain of a series of links, each link comprising a pair of similar parts, each part having a transverse opening intermediate its ends adapted when assembled to provide an opening extending completely through the chain for the reception and relatively loose support of a pole; a pivot pin at each end of each link extending through the several parts of adjoining links; means for tying the link parts together to form the chain; a track for supporting said chain; a projection on each of said link parts adapted to extend below the chain carrying surface of the track, the projections of the respective link parts being disposed at opposite sides of the track for preventing lateral displacement of the chain relative to the track; and wheels on said chain axially aligned with the pivots thereof and riding on said track for supporting the chain.

10. The combination in a pole carrying chain of a series of links, each link comprising a pair of similar parts, corresponding ends of said parts of each link being disposed in planes substantially parallel and transversely offset with respect to the opposite ends of said parts, whereby the ends of the corresponding parts of adjoining links are caused to overlap; pivot pins for said links passing through the overlapping ends of said link parts; said links each having a transversely extending opening passing completely through the link intermediate the pivots for the reception of a pole.

11. The combination in a pole carrying chain of a series of links, each link comprising a pair of similar parts, corresponding ends of said parts of each link being disposed in planes substantially parallel and transversely offset with respect to the opposite ends of said parts, whereby the ends of the corresponding parts of adjoining links are caused to overlap; pivot pins for said links passing through the overlapping ends of said link parts; said links each having a transversely extending opening passing completely through the link intermediate the pivots for the reception of a pole; a head on one end of said pivot pin; and a pin extending through the opposite end of said pivot pin for tying the link parts together.

12. The combination in a pole carrying chain of a series of links, each link comprising a pair of similar parts, corresponding ends of said parts of each link being disposed in planes substantially parallel and transversely offset with respect to the opposite ends of said parts, whereby the ends of the corresponding parts of adjoining links are caused to overlap; tubular axially aligned projections on the corresponding ends of the link parts at one end of each link; pivot pins extending through said overlapping ends and the said tubular projections; each link having a transverse opening passing completely through the link intermediate the pivots for the reception of a pole.

13. The combination in a pole carrying chain of a series of links, each link comprising a pair of similar parts, corresponding ends of said parts of each link being disposed in planes substantially parallel and transversely offset with respect to the opposite ends of said parts, whereby the ends of the corresponding parts of adjoining links are caused to overlap; tubular axially aligned projections on the corresponding ends of the link parts at one end of each link; pivot pins extending through said overlapping ends and the said tubular projections; wheels journaled on said tubular projections for supporting the chain; and a track adapted to support said wheels; each link having a transverse opening passing completely through the link intermediate the pivots for the reception of a pole.

14. The combination in a pole carrying chain of a series of links, each link comprising a pair of similar parts, corresponding ends of said parts of each link being transversely offset with respect to the opposite ends of said parts, whereby the ends of the corresponding parts of adjoining links are caused to overlap; tubular axially aligned projections on the corresponding ends of the link parts at one end of each link; pivot pins extending through said overlapping ends and the said tubular projections; wheels journaled on said tubular projections for supporting the chain; and a track adapted to support said wheels; each link part having a tapered transverse opening intermediate said pivots, the said openings in said parts being in axial alignment with each other for the reception of a pole.

15. The combination in a pole carrying chain of a series of links, each link comprising a pair of similar parts, corresponding ends of said parts of each link being transversely offset with respect to the opposite ends of said parts, whereby the ends of the corresponding parts of adjoining links are caused to overlap; tubular axially aligned projections on the corresponding ends of the link parts at one end of each link; pivot pins extending through said overlapping ends and the said tubular projections; wheels journaled on said tubular projections for supporting the chain; a track adapted to support said wheels; each link part having a tapered transverse opening intermediate said pivots, the said openings in said parts being in axial alignment with each other for the reception of a pole; and the transverse opening in each link part having a flared mouth to facilitate the insertion of a pole in the opening.

16. The combination in a pole carrying chain of a series of links, each link comprising a pair of similar parts, corresponding ends of said parts of each link being transversely offset with respect to the opposite ends of said parts, whereby the ends of the corresponding parts of adjoining links are caused to overlap; tubular axially aligned projections on the corresponding ends of the link parts at one end of each link; pivot pins extending through said overlapping ends and the said tubular projections; wheels journaled on said tubular projections for supporting the chain; a track adapted to support said wheels; each link part having a tapered transverse opening intermediate said pivots, the said openings in said parts being in axial alignment with each other for the reception of a pole; the transverse opening in each link part having a flared mouth to facilitate the insertion of a pole in the opening; and a projection on each link part at the transverse opening therein adapted to extend below the chain carrying surface of the track, for preventing lateral displacement of the chain on the track.

17. The combination in a pole carrying chain of a series of links, each link comprising a pair of similar parts, corresponding ends of said parts of each link being transversely offset with respect to the opposite ends of said parts, whereby the ends of the corresponding parts of adjoining links are caused to overlap; tubular axially aligned projections on the corresponding ends of the link parts at one end of each link; pivot pins extending through said overlapping ends and the said tubular projections wheels journaled on said tubular projections for supporting the chain; a track adapted to support said wheels; each link part having a tapered transverse opening intermediate said pivots, the said openings in said parts being in axial alignment with each other for the reception of a pole; the transverse opening in each link part having a flared mouth to facilitate the insertion of a pole in the opening; a projection on each link part at the transverse opening therein adapted to extend below the chain carrying surface of the track, for preventing lateral displacement of the chain on the track; and a rail at one side of the chain for maintaining the pole in the opening of the link.

FREDERICK KERSHAW.
EDGAR B. KERST.